United States Patent [19]

Jackson

[11] 4,323,192
[45] Apr. 6, 1982

[54] CONTROL ARRANGEMENTS FOR HEATING CIRCUITS

[75] Inventor: Harold E. Jackson, Winchester, England

[73] Assignee: Plympton Patents Limited, Hampshire, England

[21] Appl. No.: 114,343

[22] Filed: Jan. 22, 1980

[30] Foreign Application Priority Data

Jan. 23, 1979 [GB] United Kingdom ............... 02393/79

[51] Int. Cl.³ ........................... F23N 5/20; F24D 3/00
[52] U.S. Cl. ................................... 236/46 R; 236/47; 237/8 R
[58] Field of Search ............... 237/8 R; 236/46 R, 47, 236/51; 165/12

[56] References Cited

U.S. PATENT DOCUMENTS 3,306,348 2/1967 Tucker .................................. 165/12
4,217,646 8/1980 Caltagirone et al. ............... 364/104

*Primary Examiner*—William E. Wayner
*Attorney, Agent, or Firm*—Mason, Fenwick & Lawrence

[57] ABSTRACT

A control arrangement is provided for a heating system having heat outlets each controlled by a solenoid valve (210). Each heat outlet is connected to a pair of thermostatic switches (411, 413) operative at different temperatures. A time switch included in a central control means (108) is operative to selectively energize a pair of bus-bars (530, 532) at different times, thereby to provide common output signals for actuating the heat outlets via different thermostatic switches (411, 413) at different times to provide different heat outputs during different parts of a predetermined period of time (e.g. 24 hours). The central control means (108) includes a plurality of manual switches (540) each connecting the time switch output bus-bars (530, 532) to the thermostatic switches (411, 413) of an associated one of the heat outlets to manually set the heat output of the heat outlet. The time switch and each manual switch (540) cooperate in such a manner that each overrides the other as appropriate to keep the area heated by each outlet at an appropriate temperature.

10 Claims, 8 Drawing Figures

CONTROL ARRANGEMENTS FOR HEATING CIRCUITS

TECHNICAL FIELD

This invention relates to control arrangements for heating systems having a plurality of heat outlets.

BACKGROUND ART

Unless the inconvenient expedient of frequent manual adjustment at the individual heat outlets is resorted to, it is not possible to operate present-day multi-outlet heating systems, in particular central heating systems, in the most efficient and economical manner. For example, in a hotel, present-day systems do not enable a bedroom to be heated only to a low temperature when unoccupied, and heated to a suitable higher temperature when it is about to be occupied.

French Pat. No. 2,264,256 discloses a system for heating hotels in which the heating in any room is turned on when the key for that room is removed from a central bank of hooks in a reception area and is turned off when the key is returned to its hook. Such an arrangement is disadvantageous in that (a) there is no provision for low level heating when the room is unoccupied, whereby rooms can become excessively cold if unoccupied for more than a short period, and (b) it cannot function properly in conjunction with a time switch arrangement often employed in heating systems to control the heat outputs of the heat outlets at different levels during a predetermined period of time, for instance 24 hours.

DE-OS No. 2,530,855 discloses an arrangement in which heat levels in different rooms can be selectively controlled from a central location. However, it does not teach an arrangement in which selective central heat control and overall time switch control are provided in a manner in which such two forms of control are fully compatible and in particular in a manner in which an unoccupied room or group of rooms can be heated at a low level without having to effectively disconnect the time switch control from the heat outlet or outlets heating that room or group of rooms.

SUMMARY OF THE INVENTION

It is an object of the present invention to provide a control arrangement for a heating system in which central manual control and central time control of the heat outlets can be provided in a manner in which such controls are mutually compatible.

According to the invention there is provided a control arrangement for a heating system having a plurality of heat outlets, the control arrangement comprising a central control means disposed remote from the heat outlets and including a time switch operative to cause the heat outlets to provide different heat outputs during different parts of a predetermined period of time, and respective thermostat means for each heat outlet to control the heat output thereof, characterised in that each thermostat means is capable of actuating the associated heat outlet at different temperatures, the time switch is operative to cause the thermostat means to actuate the heat outlets at different temperatures at different times to provide the different heat outputs during different parts of the predetermined period of time, and the central control means includes, for each heat outlet, a manual switch coupling the time switch to the associated heat outlet via the associated thermostat means to manually set the heat output of the associated heat outlet, the time switch and each manual switch cooperating in such a manner that at least one may override the other so that the area heated by each heat outlet may be maintained at an appropriate temperature.

By virtue of the override facility, it is necessary only to operate the manual switch to ensure proper control of the heat outlets in an appropriate manner.

In a preferred embodiment, the time switch is operative to cause each thermostat means to actuate the associated heat outlet at a higher temperature to provide high level heating or at a lower temperature to provide low level heating, the manual switch, when set for low level heating, overrides the time switch to provide low level heating whether the time switch calls for high or low level heating, and, when the manual switch is set for high level heating, the time switch overrides the manual switch to provide high level heating only when the time switch calls for high level heating. If such an arrangement is installed in a hotel, for example, the only control operation necessary is to set the manual switch associated with a particular room for very low level heating when the room is unoccupied, in which case the manual switch overrides the time switch to provide low level heating at all times, and to set the manual switch for high level heating when the room is occupied, in which case the time switch overrides the manual switch and provides different levels of heating at different times.

In an advantageous way of carrying into effect the preferred embodiment outlined above, each thermostat means comprises a first thermostatic switch operative at the higher temperature and a second thermostatic switch operative at the lower temperature, the time switch is operative to provide a voltage on one or the other of first and second conductors in accordance with whether the time switch calls for high or low level heating, each manual switch comprises first and second contact sets connected, respectively, between the first conductor and the first thermostatic switch and between the second conductor and the second thermostatic switch, each manual switch is so constructed that if the first contact set is closed to call for high level heating so also is the second contact set, whereas closure of the second contact set to call for low level heating does not cause closure of the first contact set, and a unidirectional current passing device connects the sides of the contact sets of each manual switch remote from the thermostatic switches such that if only the second contact set is closed to call for low level heating the second thermostatic switch will be energised from whichever of the first and second conductors that is energised.

A control arrangement in accordance with the invention may be designed for controlling a heating system in which each heat outlet comprises one or more radiators through which, in use, a heating fluid flows. In this case, the arrangement may comprise a respective solenoid-operated valve for each heat outlet, each valve being energisable by the central control means via the thermostat means to actuate the heat outlet, and each valve comprising a coil, a plunger of magnetisable material movable within the coil on energisation of the coil, a valve member movable by the plunger away from a seating when the coil is energised to open the valve, and an aperture formed through the valve member and communicating with a flow passage for the heating fluid whereby the same pressure subsists on each side of the valve member, the internal cross-sectional areas of a housing for the plunger and of the seating being the same whereby the valve member is precisely hydraulically balanced. The precise hydraulic balancing provided in this construction tends to make the valve operate quietly, which is a significant advantage in that the valve will operate each time the thermostat means operates, whereby noisy operation would be a source of considerable disturbance and annoyance.

The aperture is preferably so dimensioned that it substantially restricts the flow of heating fluid through it as the plunger moves, thereby to hydraulically damp the plunger movement. Advantages of this construction are that the damping enhances quietness of operation and that the aperture performs the dual functions of damping and of providing the fluid flow communication enabling hydraulic balancing.

The coil is preferably housed in the plunger, which provides for a simple construction.

Each valve preferably comprises a body of magnetisable material associated with the coil and arranged to be contacted by the plunger when the valve is opened, whereby the current through the coil thereafter required to hold the valve open is less than that required to move the plunger to open the valve. This feature enables energy to be saved, in that once the valve is open only a small current drain is required to hold it open. Preferably, in this case, the central control means is operative, via the thermostat means, to make a low voltage continuously available to the valves and to make a high voltage available to the valves sequentially, whereby each valve is supplied periodically with a relatively high current pulse enabling it to open and, thereafter, a relatively low current to hold the valve open. Supplying the high voltage to the valves sequentially, rather than as individual valves demand it, means that the current demand of the valves at any one time is substantially limited to the amount needed to open one valve.

BRIEF DESCRIPTION OF THE DRAWINGS

The invention will now be further described, by way of example, with reference to the accompanying drawings, in which.

DETAILED DESCRIPTION OF THE PREFERRED EMBODIMENT

Figure 1:
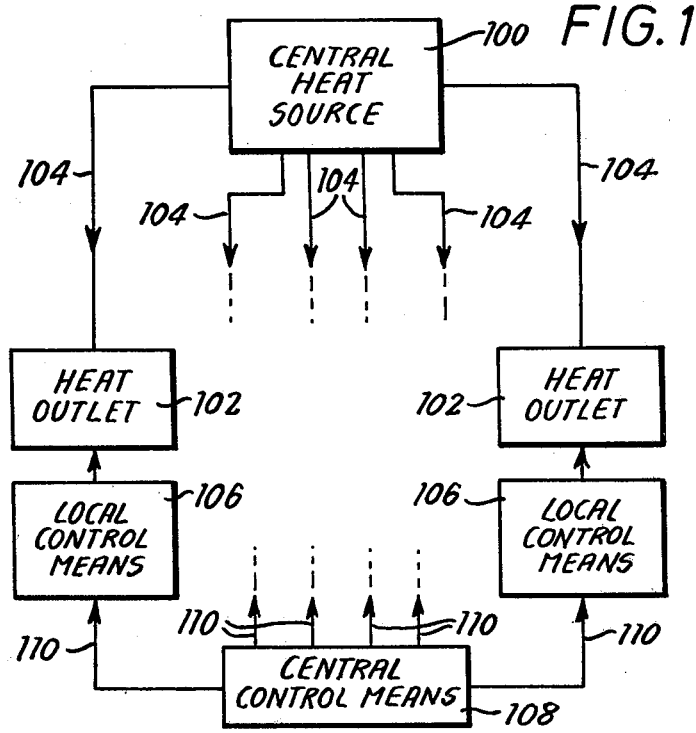
FIG. 1 is a block schematic view of a central heating system.

FIG. 1 shows a central heating system comprising a central heat source 100 connected to supply heat to a plurality of heat outlets 102, of which only two are shown, by means of heat delivery means schematically represented by lines 104. The heat outlets 102 are disposed remote from the source 100, for example in individual rooms of a hotel.

By way of example only, the system will be hereinafter further described with reference to the case in which it is embodied as a hot water central heating system. In this case, the heat source 100 may comprise a hot water boiler, each heat outlet 102 may comprise a radiator, and the heat delivery means 104 may comprise pipes interconnecting the boiler and radiators in any suitable and convenient manner. (The term 'radiator', as used herein, shall be deemed to cover either a single radiator or a group of radiators.) However, the system may be embodied in other forms. For instance, the heat outlets 102 may be convectors. Further, the system may be embodied as a warm air central heating system, in which case the heat source 100 may comprise an air heating arrangement, the lines 104 may comprise ducts, and the heat outlets 102 may comprise outlets of the ducts.

The illustrated system further comprises a respective local control means 106 for each heat outlet 102, each local control means being disposed generally at the location of the associated heat outlet. A central control means 108 is connected to each of the local control means 106 as schematically represented by lines 110, which may be electrical conductors. The central control means 108 is disposed remote from the heat outlets 102 at some convenient location or locations, for instance, in the case of a hotel, at or near the reception desk. The central control means 108 may be wholly disposed at one location or may have parts disposed at different locations. The location of the central control means 108 or a part or parts thereof may or may not be the same as the location of the central heat source 100. The functioning and construction of preferred forms of the local control means 106 and central control means 108 will become apparent as this description proceeds.

Figure 2:
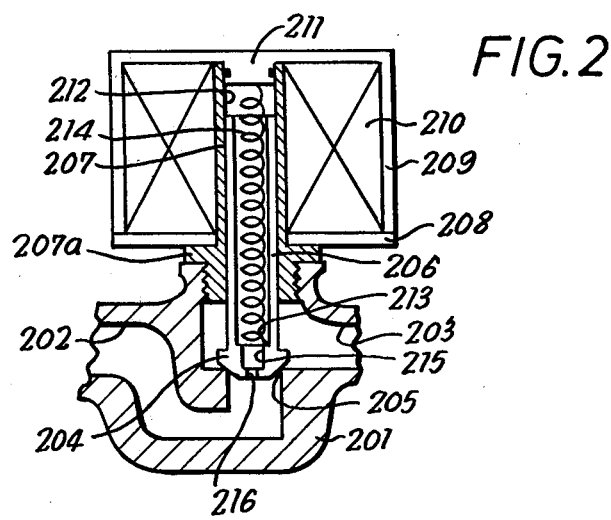
FIG. 2 is an axial sectional view of a solenoid-operated valve that can be used in the system of FIG. 1 for controlling a radiator thereof.

The local control means 106 for each heat outlet 102, which is assumed to be a radiator, consists of or includes a solenoid-operated valve for controlling the radiator, the valve preferably being as illustrated in FIG. 2, to which reference will now be made.

The solenoid-operated valve shown in FIG. 2 comprises a body 201 having an inlet passage 202 and an outlet passage 203 which may be isolated from the inlet passage by engagement of a valve member 204 with a seating 205. The valve member 204 comprises an end portion of a plunger 206 which is made of a magnetisable material and acts as a solenoid armature. The plunger 206 is slidably mounted as a close fit in a sleeve 207 formed from non-magnetic material and screwed into a tapped hole in the body 201 as shown. A disc 208 of magnetisable material surrounds the sleeve 207, resting on a flanged portion 207a thereof, and an inverted cap 209, also of magnetisable material, is mounted on the disc 208 as shown, the disc 208 and cap 209 cooperating to form a housing of magnetisable material enclosing a coil 210 which surrounds the part of the sleeve 207 that is above the flanged portion 207a as shown in FIG. 2. A projection 211 from the cap 209 enters the upper end of the sleeve 207 as shown in FIG. 2 and is in sealing relationship therewith. The plunger 206 has a bore 212 therein, the bore extending from the upper end of the plunger as shown in FIG. 2 as far as an annular shoulder 213. A spring 214 is disposed within the bore 212 and acts between the projection 211 and the shoulder 213 to urge the valve member 204 against the seating 205 to close the valve. A bore 215, of smaller diameter than the bore 212, extends downwardly from the bore 212 below the shoulder 213, and a drilling 216 of even smaller diameter joins the bore 215 to the lower end of the plunger 206 defining the valve member 204. The drilling 216 ensures that the valve member 204 and plunger 206 are hydraulically balanced whereby forces exerted on the plunger are independent of the pressures subsisting in the inlet passage 202 and outlet passage 203. As can be seen from FIG. 2, the internal diameters (and therefore the cross-sectional areas) of the sleeve 207 and the seating 205 are the same, whereby the forces acting on the plunger 206 in each direction are identical so that precise hydraulic balancing is obtained.

The valve described above may be opened to connect the inlet and outlet passages 202, 203 to allow hot water to flow through the radiator 102 by supplying a current to the coil 210 to cause the plunger 206 to rise to move the valve member 204 away from the seating 205 against the action of the spring 214. Because there is a gap between the upper end of the plunger 206 and the projection 211 when the valve is closed, relatively high current must be supplied to the coil 210 to open the valve. However, when the valve has opened the upper end of the plunger 206 abuts the projection 211, and since both the plunger 206 and cap 209 are of magnetisable material, the current then required to maintain the valve open is reduced to a relatively low value. As will be explained hereinbelow, the central control means 108 is operative to supply a relatively high current to the coil 210 to open the valve, when required, and then to supply a relatively low current to maintain it in the open condition.

When the valve of FIG. 2 is opened, and also when it is closed, the plunger 206 displaces water from or to the space between the plunger 206 and the projection 211. Since the displaced water has to pass through the smaller diameter drilling 216, a hydraulic damping effect is produced, whereby the speed at which the plunger can move during valve opening and closure is limited, whereby quiet operation of the valve results. The drilling 216 thus serves the dual functions of providing hydraulic balance and of providing hydraulic damping to ensure quiet operation.

Figure 3:
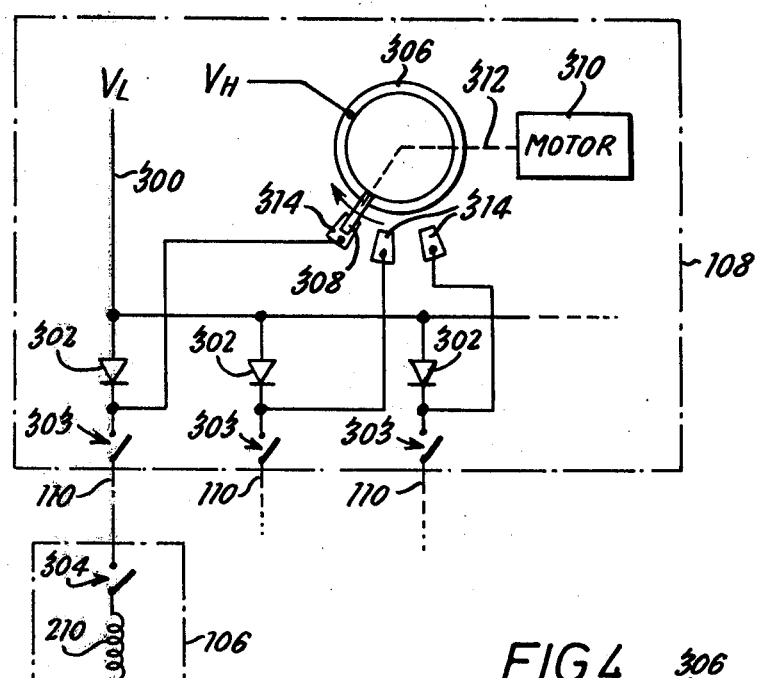
FIG. 3 is a circuit diagram of part of the system of FIG. 1 showing an arrangement for switching a plurality of valves as shown in FIG. 2.

FIG. 3 shows how the coils 210 of the solenoid valves of the various local control means 106 may be switched by the central control means 108. In the central control means 108, a source of a relatively low voltage $V_L$ is connected by a line 300 to the anodes of a plurality of diodes 302. The cathodes of the diodes are connected via manually-operable switches 303 disposed in the central control means 108, and via the lines 110, which are in the form of electrical conductors, each to a respective one of the local control means 106, only one of which is shown. At each local control means 106, the associated line 110 is connected to one end of the coil 210 via a room thermostatic switch or thermostat 304 disposed in the room in which the associated radiator 102 is disposed to maintain a constant temperature in the room. Although, for simplicity, FIG. 3 shows a single pole switch 303 and a single thermostatic switch 304, the preferred arrangement is more complex, as will be seen from the description of FIG. 6 that follows below.

Also in the central control means 108, a source of a relatively high voltage $V_H$ is connected to a slip ring 306. A brush 308, rotated by an electric motor 310 as schematically represented by a dotted line 312, connects the slip ring successively to a respective one of a series of contacts 314 each connected to the cathode of a respective one of the diodes 302. The diodes 302 prevent the high voltage source from feeding into the low voltage source.

The arrangement of FIG. 3 operates in the following manner. The switches 303 enable the radiators 102 to be centrally controlled, in that the valve of any radiator can only be energised to allow hot water to flow through the radiator if the associated switch 303 is closed. Considering the coil 210 of the valve of any of the radiators 102, if the associated switch 303 is closed (and if the room thermostat 304 is also closed) a relatively low current will be continuously supplied thereto from the source of the low voltage $V_L$ and pulses of a relatively high current will be periodically supplied thereto from the source of the high voltage $V_H$ each time the brush 308 connects the associated contact 314 to such source via the slip ring 306. The duration of the high current pulse is sufficient to open the valve if it was previously closed. In between the high current pulses, the low current from the source of the low voltage $V_L$ is sufficient to keep the valve open. Consequently, for each of the radiators 102, each time the associated switch 303 is closed and/or each time the associated room thermostat 304 calls for more heat by closing, the radiator valve will be opened when the next high current pulse is supplied to the associated coil 210 and will thereafter be maintained open by the continuous low current supply.

With the arrangement of FIG. 3, since a high current pulse is supplied only to one valve at a time, the total current requirement of the system is limited. Furthermore, energy is conserved and the coils 210 are prevented from overheating in that, for most of the time any of the valves is required to be open, the coil thereof is supplied with a low current sufficient only to maintain it open rather than a high current sufficient to open it.

As will be apparent, the slip ring 306, brush 308, motor 310 and contacts 314 in FIG. 3 may be replaced by electronic circuitry designed to sequentially produce high current pulses as described.

Figure 4:
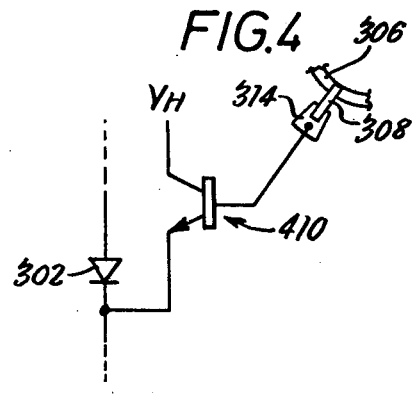
FIG. 4 is a partial view of a possible modification of the circuit of FIG. 3.

FIG. 4 shows a possible modification of the arrangement of FIG. 3. In the modification, each of the contacts 314 is connected to the anode of the associated diode 302 via a transistor 410. The base of each transistor 410 is connected to the associated contact 314 and its emitter is connected to the anode of the associated diode 302. The collector of each transistor 410 is connected to the source of the high voltage $V_H$. When a contact 314 is connected by the brush 308 to the source of the high voltage $V_H$, the associated transistor is switched from a non-conductive state to a conductive state in which it connects the voltage $V_H$ to the associated line 110. This modification reduces the current carried by the slip ring 306, brush 308 and contacts 314.

In the circuits of FIGS. 3 and 4, the source of the low voltage $V_L$ is controlled by a time switch (not shown) whereby different levels of heat (and possibly no heating at all) are provided during different parts of a predetermined period of time, e.g. 24 hours. There will now be described, with reference to FIGS. 5 and 6, a circuit for enabling automatic time-switching of the radiators between the different heating levels.

Figure 5:
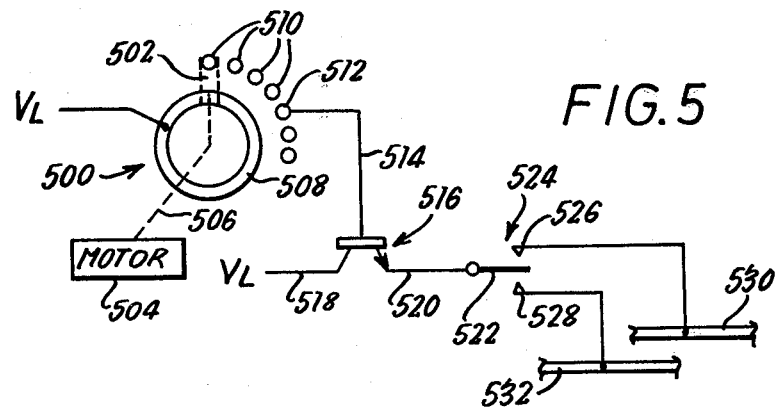
FIGS. 5 and 6 show respective parts of a circuit permitting automatic time-switching of the heat outputs of radiators of the central heating system.

Referring first to FIG. 5, which shows circuitry disposed in the central control means 108, there is provided a time switch 500 comprising a brush 502 rotationally driven by an electric motor 504, as shown schematically by a dotted line 506, at a speed of one revolution every 24 hours and constantly in contact with a slip ring 508. The brush 502 successively engages each of a plurality of contacts 510 for a period of one or more hours in accordance with the shape of the contacts. The slip ring 508 is fed with low voltage $V_L$ from the above-mentioned low voltage source. When the brush engages, for example, a particular one of the contacts 510 designated 512 in FIG. 5, the low voltage is applied via a line 514 to the base of a transistor 516 which, since its collector is fed with the low voltage $V_L$, then becomes conductive so that low voltage current can pass via lines 518 and 520 to a movable contact 522 of a switch 524. The switch 524 can be manually operated to connect the movable contact 522 to either of a pair of fixed contacts 526 and 528 of the switch which, in turn, are respectively connected to bus-bars 530 and 532; or can be operated, as shown, to disconnect the movable contact 522 so that no voltage is available at either of the bus-bars. For the period of time during which the brush 502 engages the contact 512, one or the other of the bus-bars is energised according to the manual setting of the switch 524. Similarly, for each other period of time in each 24 hours, one or the other of the bus-bars 530, 532, or neither of them, can be energised via other transistor/switch circuits, like that described, interconnecting the other contacts 510 and the bus-bars 530, 532, whereby by setting the individual switches such as 524 the heating pattern for a 24 hour period can be programmed.

As will now be described, this energisation of one or the other of the bus-bars 530, 532 determines whether a higher or a lower level of heating is available at each area being heated by the radiators 102, unless, in the case of each individual radiator, the level is limited by manual switching to the lower level. Also now to be described is means whereby the time switch 500 is operative to reduce the heating level of those areas which would otherwise be switched manually to the higher level.

Figure 6:
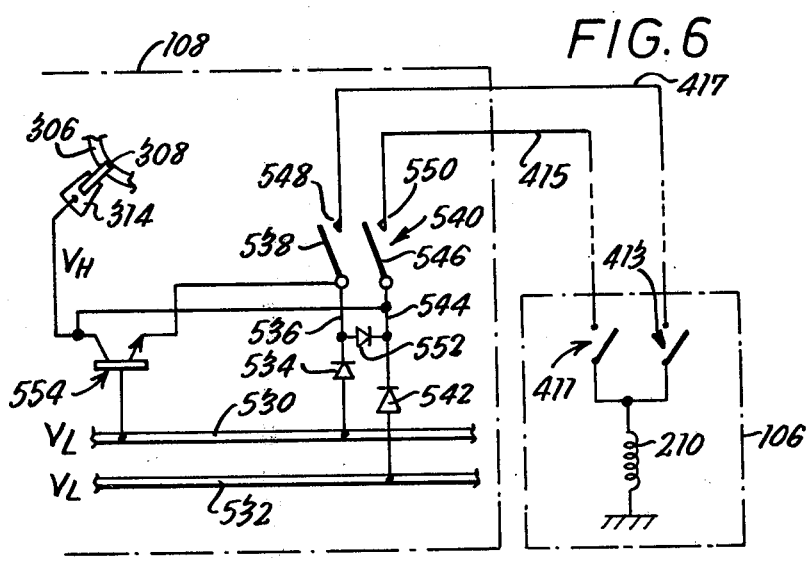

Referring now to FIG. 6, for each radiator 102 there is provided in the central control means 108 a switching circuit as shown in the left-hand half of FIG. 6. From the bus-bar 530, a diode 534 leads to a line 536 which, in turn, leads to a movable contact 538 of a manually-operable switch 540. Similarly, a diode 542 connects the bus-bar 532 to a line 544 leading to another movable contact 546 of the switch 540. Fixed contacts 548, 550 of the switch 540 are connected by conductors 417, 415 to high and low temperature room thermostats or thermostatic switches 413, 411 operative to close at high and low temperatures respectively, the thermostats being in turn connected to the coil 210 of the valve of the associated radiator 102. (The switches 413, 411, although shown as discrete switches, may be embodied as a single multi-level switch arrangement). A diode 552, connected as shown, allows current to flow from the line 536 to the line 544, but not vice-versa.

The switch 540 is so designed that, if the contacts 538 and 548 are engaged, then so are the contacts 546 and 550, but that the contacts 546 and 550 can be engaged while the contacts 538, 548 are not engaged. It is also possible for both pairs of contacts 538, 548 and 546, 550 to be disengaged.

In operation of the circuit of FIGS. 5 and 6, if the bus-bar 530 is energised by the time switch 500 and if the contacts 538 and 548 are engaged, current can flow via the diode 534 and the contacts 538, 548 to the high level thermostat or thermostatic switch 413 to maintain the solenoid valve open so long as the temperature of that thermostat is below its set value.

If, on the other hand, only the contacts 546 and 550 are engaged, current cannot flow to the high level thermostatic switch 413, but current can flow through the diode 552 and the contacts 546 and 550 to the low level thermostatic switch 411. Thus, even if the time switch 500, through the bus-bar 530, calls for high level heating, the manual switching of the switch 540 overrides that call and only low level heating is made available.

If the bus-bar 532 is energised by the time switch 500 instead of the bus-bar 530, current can pass via the diode 542 and the contacts 546 and 550 to the low level thermostat or thermostatic switch 411 and so the the solenoid valve if the temperature of that thermostat is below its set value. The diode 552 prevents current from passing from the bus-bar 532 to the high level thermostatic switch 413 even if the contacts 538 and 548 are engaged. Thus, even if the manually operated switch 540, by engagement of the contacts 538, 548, calls for high level heating, the time switch 500, by energising only the bus-bar 532, overrides the manual switching to make available only low level heating.

The circuits of FIGS. 5 and 6 as so far described can only maintain each solenoid valve in the open position after it has been opened. It is necessary to make available, when required, the high voltage pulses previously described with reference to FIG. 3 in order to open the solenoid valves.

Accordingly, the circuit of FIGS. 5 and 6 includes the arrangement of the slip ring 306, brush 308, motor 310 and contacts 314 as described above with reference to FIG. 3. The high voltage pulse from the associated one of the contacts 314 is directed to the line 544 of the low level heating circuit and also to the collector of a transistor 554, the base of which is connected to the bus-bar 530. So long as high level heating is called for by the time switch 500, the bus-bar 530 is energised and the transistor 554 remains conducting. When the time switch 500 calls for low level heating, the bus-bar 530 is not energised and the transistor 554 becomes non-conducting. Thus, when the time switch 500 calls for high level heating, the high voltage pulse can pass through the transistor 554 to the high level thermostatic switch 413 provided that the manual switching also calls for high level heating by closure of the contacts 538 and 548 of the switch 540. When, however, the time switch 500 calls for low level heating, the transistor 554 is non-conducting and current cannot pass to the high level thermostatic switch 413 even if the contacts 538 and 548 are engaged, whereby the solenoid valve cannot be opened via the high level thermostatic switch 413.

Figure 7:
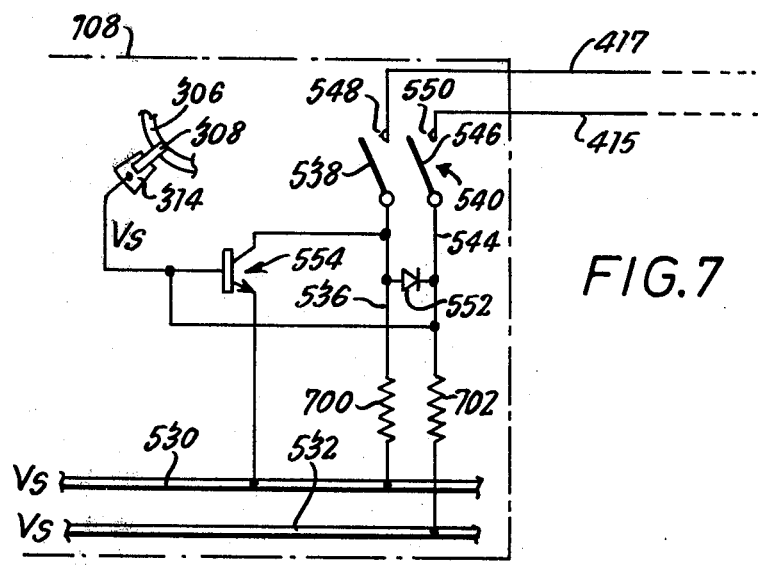
FIGS. 7 and 8 show parts of respective modified circuits each similar to that of FIGS. 5 and 6.

A modification of the circuit of FIGS. 5 and 6 in which, instead of separately supplying to the lines 415 and 417 from different sources the low and high voltages for opening and holding open the solenoid valve, a single (high) voltages $V_S$ is used, will now be described with reference to FIG. 7. The part of the modified circuit shown in FIG. 7 largely corresponds to FIG. 6 and will only be described in so far as it differs therefrom.

The single voltage $V_S$ is supplied by the time switch 500 to one or the other of the bus-bars 530, 532, in the manner previously described with reference to FIG. 5, instead of the low voltage $V_L$. The same voltage $V_S$ is supplied in pulses, in the manner previously described with reference to FIGS. 3 and 5, except that the transistor 554 is differently arranged in FIG. 7 and the pulses are supplied to its base. However, as in FIG. 6, the pulses are supplied directly to the line 544. Instead of the diodes 534 and 542 there are provided resistors 700 and 702 which serve to reduce the current flowing through the solenoid valve coil while the solenoid valve is being held open. The pulses are supplied to the contacts 538 and 546, by-passing the resistors 700, 702, and allowing full current to flow through the coil 210 so as to open the solenoid valve.

Another modification of the circuit of FIGS. 5 and 6 will now be described with reference to FIG. 8. The part of the modified circuit shown in FIG. 8 largely corresponds to FIG. 6 and will only be described in so far as it differs therefrom.

In the modified circuit, the low voltage $V_L$ is supplied by the time switch 500 to one or the other of the bus-bars 530, 532 in the manner described above with reference to FIG. 5. Further, for each radiator 102, the bus-bars 530, 532 are connected to the thermostatic switches 411, 413 by a switch 540, and diodes 534, 542 and 552 as described above with reference to FIG. 6. However, the arrangement whereby pulses of the high voltage $V_H$ are supplied to the contact sets 538, 548 and 546, 550 of the individual switches 540 differs somewhat from that described with reference to FIG. 6, as will now be described.

In FIG. 6, each of the contacts 314 is connected to the associated switch 540 via a respective transistor 554. On the other hand, in the circuit of FIG. 8 only two transistors 802, 804 serve to control the application of the high voltage pulses to any number of the switches 540. In the circuit of FIG. 8, the slip ring 306, brush 308 and contacts 314, as described with reference to FIG. 3, are replaced by a like arrangement comprising two slip rings 806, 808, a brush 810 and a plurality of contacts corresponding to the contacts 314 and designated, alternately, 812, and 814. Each contact 812 is connected to a switch 540 as shown, and the adjacent contact 814 in the direction of movement of the brush 810 is connected to the same switches, again as shown. The slip ring 806 is provided with radially outwardly extending projections 820 aligned with contacts 812. The slip ring 808 is provided with radially inwardly extending projections 822 aligned with the contacts 814. The brush 810 is arranged to contact no part of the slip rings 806, 808 other than the projections 820, 822. The brush 810 is driven by drive means (not shown) such that it dwells in line with each projection 820, 822 in turn for long enough to supply a high voltage pulse to the radiator valve 210 of sufficient duration to open the valve; and is then rotated quickly to become in line with the next projection 820, 822.

The above-mentioned transistors 802, 804 have their collectors connected to the source of the high voltage $V_H$, their bases connected to the bus-bars 530 and 532, respectively, and their emitters connected to the slip rings 808, 806, respectively. Suppose the time switch 500 calls for low level heating, i.e. the bus-bar 532 is energised with the low voltage $V_L$ and the bus-bar 530 is not energised. The transistor 802 is held off, but the transistor 804 is switched on and current can flow from the high voltage source to the slip ring 806 and through the brush 810 and contact 814 to the low level thermostatic switch 411, when the brush 810 interconnects a projection 820 of the slip ring 806 and the contact 814. If, on the other hand, the time switch 500 calls for high level heating by energising the bus-bar 530 instead of the bus-bar 532, the transistor 804 is cut off and current can flow from the high voltage source to the slip ring 808 and through the brush 810 and contact 812 to the high level thermostatic switch 413, when the brush 810 interconnects a projection 822 of the slip ring 808 and the contact 812.

Figure 8:
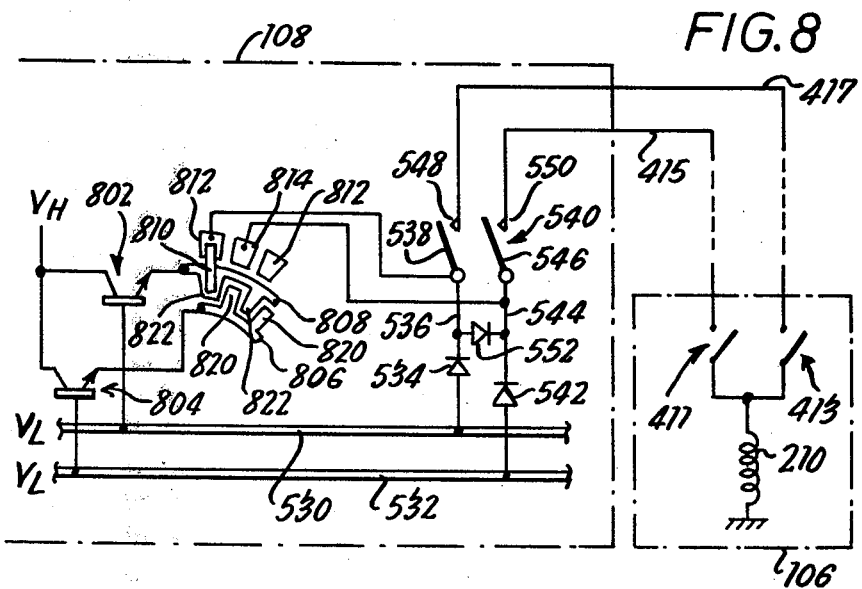

Thus, the circuit of FIG. 8 operates in similar manner to the circuit of FIG. 6, except that due to the provision of the dual slip-ring arrangement as described it is possible to employ only two transistors 802, 804 for any number of radiators, rather than one transistor 554 per radiator.

The invention may be embodied in other ways than that described above by way of example. For instance, as mentioned above, the thermostatic switches 411, 413 may be embodied as a single multilevel switch arrangement instead of discrete switches. In this case the discrete switches might be replaced by a thermal responsive device and an adjacent heater which when dissipating a high wattage causes the device to switch at a lower ambient temperature and which when dissipating a low wattage causes the device to switch at a higher temperature. Alternatively, a temperature dependent resistor (e.g. a thermistor) may be supplied with current at different voltages or be connected in a network of resistors, the value of one of which can be changed by switching.

I claim:

1. In a control arrangement for a heating system having a plurality of heat outlets, the control arrangement comprising a central control means disposed remote from the heat outlets and including a time switch operative to cause the heat outlets to provide different heat outputs during different parts of a predetermined period of time, and respective thermostat means for each heat outlet to control the heat output thereof, the improvement comprising:

each thermostat means being capable of actuating the associated heat outlet at different temperatures;

said time switch being operative to cause said thermostat means to actuate the heat outlets at different temperatures at different times to provide the different heat outputs during different parts of the predetermined period of time; and said central control means including, for each heat outlet, a manual switch coupling said time switch to the associated heat outlet via the associated thermostat means to manually set the heat output of the associated heat outlet, said time switch and each manual switch cooperating in such a manner that at least one may override the other so that the area heated by each heat outlet may be maintained at an appropriate temperature.

2. A control arrangement according to claim 1, wherein:

said time switch is operative to cause each thermostat means to actuate the associated heat outlet at a higher temperature to provide high level heating or at a lower temperature to provide low level heating;

said manual switch, when set for low level heating, overrides said time switch to provide low level heating whether the time switch calls for high or low level heating; and when said manual switch is set for high level heating, said time switch overrides the manual switch to provide high level heating only when the time switch calls for high level heating.

3. A control arrangement according to claim 2, wherein:

each thermostat means comprises a first thermostatic switch operative at said higher temperature and a second thermostatic switch operative at said lower temperature;

said time switch is operative to provide a voltage on one or the other of first and second conductors in accordance with whether the time switch calls for high or low level heating;

each manual switch comprises first and second contact sets connected, respectively, between said first conductor and said first thermostatic switch and between said second conductor and said second thermostatic switch;

each manual switch is so constructed that if said first contact set is closed to call for high level heating so also is said second contact set, whereas closure of said second contact set to call for low level heating does not cause closure of said first contact set; and a unidirectional current passing device connects the sides of said contact sets of each manual switch remote from said thermostatic switches such that if only the second contact set is closed to call for low level heating the second thermostatic switch will be energised from whichever of said first and second conductors that is energised.

4. A control arrangement according to claim 1, for a heating system in which each heat outlet comprises one or more radiators through which, in use, a heating fluid flows, comprising a respective solenoid-operated valve for each heat outlet, each valve being energisable by said central control means via said thermostat means to actuate the heat outlet, and each valve comprising a coil, a plunger of magnetisable material movable within said coil on energisation of the coil, a valve member movable by said plunger away from a seating when said coil is energised to open said valve, and an aperture formed through said valve member and communicating with a flow passage for the heating fluid whereby the same pressure subsists on each side of the valve member, the internal cross-sectional areas of a housing for said plunger and of said seating being the same whereby said valve member is precisely hydraulically balanced.

5. A control arrangement according to claim 4, wherein said aperture is so dimensioned that it substantially restricts the flow of heating fluid through it as said plunger moves, thereby to hydraulically damp the plunger movement.

6. A control arrangement according to claim 4, wherein said coil is housed within said plunger.

7. A control arrangement according to claim 4, wherein each valve comprises a body of magnetisable material associated with said coil and arranged to be contacted by said plunger when the valve is opened, whereby the current through said coil thereafter required to hold the valve open is less than that required to move said plunger to open the valve.

8. A control arrangement according to claim 7, wherein said central control means is operative, via said thermostat means, to make a low voltage continuously available to said valves and to make a high voltage available to the valves sequentially, whereby each valve is supplied periodically with a relatively high current pulse enabling it to open and, thereafter, a relatively low current to hold the valve open.

9. A control arrangement according to claim 8, wherein:

said time switch is operative to cause each thermostat means to actuate the associated heat outlet at a higher temperature to provide high level heating or at a lower temperature to provide low level heating;

said manual switch, when set for low level heating, overrides said time switch to provide low level heating whether the time switch calls for high or low level heating;

when said manual switch is set for high level heating, said time switch overrides the manual switch to provide high level heating only when the time switch calls for high level heating;

each thermostat means comprises a first thermostatic switch operative at said higher temperature and a second thermostatic switch operative at said lower temperature;

said time switch is operative to provide said low voltage on one or the other of first and second conductors in accordance with whether the time switch calls for high or low level heating;

each manual switch comprises first and second contact sets connected, respectively, between said first conductor and said first thermostatic switch and between said second conductor and said second thermostatic switch;

each manual switch is so constructed that if said first contact set is closed to call for high level heating so also is said second contact set, whereas closure of said second contact set to call for low level heating does not cause closure of said first contact set;

a unidirectional current passing device connects the sides of said contact sets of each manual switch remote from said thermostatic switches such that if only the second contact set is closed to call for low level heating the second thermostatic switch will be energised from whichever of said first and second conductors that is energised; and said central control means is operative to sequentially apply a high voltage source to the ends of said contact sets of said manual switches remote from said thermostatic switches.

10. A control arrangement according to claim 8, wherein:

said time switch is operative to cause each thermostat means to actuate the associated heat outlet at a higher temperature to provide high level heating or at a lower temperature to provide low level heating;

said manual switch, when set for low level heating, overrides said time switch to provide low level heating whether the time switch calls for high or low level heating;

when said manual switch is set for high level heating, said time switch overrides the manual switch to provide high level heating only when the time switch calls for high level heating;

each thermostat means comprises a first thermostatic switch operative at said higher temperature and a second thermostatic switch operative at said lower temperature;

said time switch is operative to provide said high voltage on one or the other of first and second conductors in accordance with whether the time switch calls for high or low level heating;

each manual switch comprises first and second contact sets connected, respectively, between said first conductor and said first thermostatic switch and between said second conductor and said second thermostatic switch;

each manual switch is so constructed that if said first contact set is closed to call for high level heating so also is said second contact set, whereas closure of said second contact set to call for low level heating does not cause closure of said first contact set;

a unidirectional current passing device connects the sides of said contact sets of each manual switch remote from said thermostatic switches such that if only the second contact set is closed to call for low level heating the second thermostatic switch will be energised from whichever of said first and second conductors that is energised;

said first and second conductors are connected to said contact sets via resistors thereby to make a low voltage continuously available to said valves; and said central control means is operative to sequentially apply said high voltage to the ends of said contact sets of said manual switches remote from said thermostatic switches.

* * * * *